United States Patent
Xie et al.

(10) Patent No.: US 12,179,978 B2
(45) Date of Patent: Dec. 31, 2024

(54) LAMINATING FILM RESISTANT TO DISCOLORATION CAUSED BY COOKING, AND FILM-LAMINATED METAL SHEET

(71) Applicant: BAOSHAN IRON & STEEL CO., LTD., Shanghai (CN)

(72) Inventors: Long Xie, Shanghai (CN); Zhangwei Wang, Shanghai (CN); Hua Ni, Shanghai (CN); Xiujun Li, Shanghai (CN); Hongxing Chen, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 741 days.

(21) Appl. No.: 17/277,479

(22) PCT Filed: Sep. 19, 2019

(86) PCT No.: PCT/CN2019/106615
§ 371 (c)(1),
(2) Date: Mar. 18, 2021

(87) PCT Pub. No.: WO2020/057586
PCT Pub. Date: Mar. 26, 2020

(65) Prior Publication Data
US 2021/0347545 A1  Nov. 11, 2021

(30) Foreign Application Priority Data
Sep. 19, 2018 (CN) .......................... 201811090597.8

(51) Int. Cl.
| | | |
|---|---|---|
| *B65D 65/40* | (2006.01) | |
| *B29C 48/08* | (2019.01) | |
| *B29C 48/21* | (2019.01) | |
| *B29K 67/00* | (2006.01) | |
| *B29K 509/08* | (2006.01) | |
| *B32B 15/09* | (2006.01) | |
| *B32B 15/18* | (2006.01) | |
| *B32B 15/20* | (2006.01) | |
| *B32B 27/08* | (2006.01) | |
| *B32B 27/20* | (2006.01) | |
| *B32B 27/36* | (2006.01) | |
| *B65D 6/00* | (2006.01) | |

(Continued)

(52) U.S. Cl.
CPC ............. *B65D 65/40* (2013.01); *B29C 48/08* (2019.02); *B29C 48/21* (2019.02); *B32B 15/09* (2013.01); *B32B 15/18* (2013.01); *B32B 15/20* (2013.01); *B32B 27/08* (2013.01); *B32B 27/20* (2013.01); *B32B 27/36* (2013.01); *B65D 7/42* (2013.01); *C08J 5/18* (2013.01); *C08L 67/02* (2013.01); *B29K 2067/003* (2013.01); *B29K 2509/08* (2013.01); *B32B 2250/04* (2013.01); *B32B 2264/101* (2013.01); *B32B 2270/00* (2013.01); *B32B 2307/732* (2013.01); *B32B 2439/66* (2013.01); *B32B 2439/70* (2013.01); *C08J 2367/02* (2013.01); *C08J 2467/02* (2013.01); *C08L 2203/16* (2013.01); *C08L 2205/025* (2013.01)

(58) Field of Classification Search
CPC .......... B65D 65/40; B65D 7/42; B29C 48/08; B29C 48/21; B32B 15/09; B32B 15/18; B32B 15/20; B32B 27/08; B32B 27/20; B32B 27/36; B32B 2250/04; B32B 2264/101; B32B 2270/00; B32B 2307/732; B32B 2439/66; B32B 2439/70; C08J 5/18; C08J 2367/02; C08J 2467/02; C08L 67/02; C08L 2203/16; C08L 2205/025; B29K 2067/003; B29K 2509/08
See application file for complete search history.

(56) References Cited

U.S. PATENT DOCUMENTS

| | | | | |
|---|---|---|---|---|
| 2014/0339123 A1* | 11/2014 | Nakagawa | ............. | B65D 25/00 206/524.2 |
| 2015/0321822 A1* | 11/2015 | Moritz | ..................... | B65D 7/12 428/35.9 |

(Continued)

FOREIGN PATENT DOCUMENTS

| | | |
|---|---|---|
| CN | 103144389 A | 6/2013 |
| CN | 104023974 A | 9/2014 |
| CN | 104245307 A | 12/2014 |

(Continued)

OTHER PUBLICATIONS

CN-106427149-A; machine translation (Year: 2017).*

(Continued)

*Primary Examiner* — Travis M Figg
(74) *Attorney, Agent, or Firm* — Lei Fang, Esq.; Smith Tempel Blaha LLC

(57) ABSTRACT

A blended polyester laminating film resistant to discoloration caused by cooking, comprising polyethylene terephthalate and polybutylene terephthalate. The blended polyester laminating film comprises three layers, i.e., upper, middle, and lower layers. One surface layer contains $SiO_2$ in a mass fraction of 1200-2000 ppm added by in-situ polymerization. The blended polyester laminating film is manufactured by a three-layer coextrusion biaxial stretching method, and the manufacturing method is 240-275° C. A film-laminated metal sheet manufactured from the blended polyester laminating film has excellent resistance to discoloration caused by cooking, and is applied to metal containers for food and beverage packaging that require high-temperature sterilization.

19 Claims, No Drawings

(51) Int. Cl.
    *C08J 5/18*   (2006.01)
    *C08L 67/02*  (2006.01)

(56)          References Cited

U.S. PATENT DOCUMENTS

2018/0076423 A1*  3/2018  Kokuryo ................... B32B 7/12
2018/0244878 A1*  8/2018  Inagaki .................. C08G 63/16

FOREIGN PATENT DOCUMENTS

CN          106427149 A   *  2/2017
CN          107475811 A      12/2017
JP          2004075924 A      3/2004
WO          2015/171193 A1   11/2015
WO          2019/023411 A1    1/2019
WO       WO-2020010318 A1 *  1/2020  ............. B32B 15/09

OTHER PUBLICATIONS

EP Search report dated Feb. 23, 2022 for EP App No. 19863537.7.
International Search Report mailed on Dec. 13, 2019 for PCT Patent Application No. PCT/CN2019/106615.
Written Opinion mailed on Dec. 13, 2019 for PCT Patent Application No. PCT/CN2019/106615.

* cited by examiner

LAMINATING FILM RESISTANT TO DISCOLORATION CAUSED BY COOKING, AND FILM-LAMINATED METAL SHEET

CROSS-REFERENCE TO RELATED APPLICATIONS

This application is a 371 U.S. National Phase of PCT International Application No. PCT/CN2019/106615 filed on Sep. 19, 2019, which claims benefit and priority to Chinese patent application no. CN 201811090597.8 filed on Sep. 19, 2018, the contents of both are incorporated by reference herein in their entireties.

TECHNICAL FIELD

The present disclosure relates to the field of film-laminated metal plates for metal packaging, and more particularly to a steel-laminating film resistant to discoloration caused by cooking and a film-laminated metal plate.

BACKGROUND ART

In recent years, the development of the polyethylene terephthalate (polyester) industry is very rapid. There are a large number of well-known domestic and foreign companies producing polyester materials and polyester equipment. In 1987, the output of polyester across the world has leapt to the fifth rank among the engineering plastics. Film represents an important branch in the applications of polyester materials, and it is widely used for packaging food and beverage. In recent years, due to the rise of the technology for laminating films on metals, bonding a steel-laminating film (i.e. a film to be laminated on steel) to a metal plate by hot melt lamination has solved the problem of precipitation of harmful bis-phenol A substances caused by an indispensable step of coating the inside of metal cans in a traditional process. This problem has attracted worldwide concern. As the technology for laminating films on metal plates is spread gradually, steel-laminating films have been widely accepted as a substitute for coatings for improving the safety of canned food.

While the existing film-laminated metal plates are widely used for food and beverage packaging containers, after the cans are formed, it is often necessary to sterilize the canned food and beverage at a high temperature for a long time by high-temperature cooking. After the existing film-laminated steel/film-laminated cans are sterilized by high-temperature cooking, obvious discoloration will occur to the films, which seriously affects the appearance of the packaging containers.

SUMMARY

An object of the present disclosure is to provide a film-laminated steel having excellent resistance to cooking discoloration (discoloration caused by cooking), and the film-laminated steel has excellent overall properties when used for food and beverage packaging containers.

In order to achieve the above object, the following technical solution is adopted according to the present disclosure.

According to one aspect of the present disclosure, there is provided a blended polyester steel-laminating film resistant to cooking discoloration, wherein the blended polyester steel-laminating film comprises polyethylene terephthalate (PET) and polybutylene terephthalate (PBT), wherein the blended polyester steel-laminating film comprises three layers including an upper layer, an intermediate layer and a lower layer, wherein at least one of the upper layer and the lower layer of the blended polyester steel-laminating film comprises 1200-2000 ppm by mass of $SiO_2$ added by in-situ polymerization.

According to one aspect of the present disclosure, there is provided a blended polyester steel-laminating film resistant to cooking discoloration, wherein the blended polyester steel-laminating film comprises polyethylene terephthalate and polybutylene terephthalate, wherein the blended polyester steel-laminating film comprises three layers including an upper layer, an intermediate layer and a lower layer, wherein a skin layer (i.e. the lower layer or the upper layer) of the blended polyester steel-laminating film comprises 1800 ppm by mass of $SiO_2$ added by in-situ polymerization.

In the blended polyester steel-laminating film resistant to cooking discoloration according to one aspect of the present disclosure, the blended polyester steel-laminating film is a homogeneous mixture of polyethylene terephthalate and polybutylene terephthalate, wherein the three layers including the upper layer, the intermediate layer and the lower layer are formed into the blended polyester steel-laminating film by a three-layer co-extrusion biaxial stretching process.

In the blended polyester steel-laminating film resistant to cooking discoloration according to one aspect of the present disclosure, the blended polyester steel-laminating film is manufactured at a temperature of 240-275° C.

In the blended polyester steel-laminating film resistant to cooking discoloration according to one aspect of the present disclosure, a mass ratio of polyethylene terephthalate to polybutylene terephthalate in the blended polyester steel-laminating film ranges from 6:4 to 4:6.

In the blended polyester steel-laminating film resistant to cooking discoloration according to one aspect of the present disclosure, the mass ratio of polyethylene terephthalate to polybutylene terephthalate is 6:4, 5:5 or 4:6.

In the blended polyester steel-laminating film resistant to cooking discoloration according to one aspect of the present disclosure, the blended polyester steel-laminating film has a thickness of 12-35 um.

According to another aspect of the present disclosure, there is provided a film-laminated metal plate, wherein the film-laminated metal plate comprises a metal substrate and the blended polyester steel-laminating film resistant to cooking discoloration described above.

In the film-laminated metal plate according another aspect of the present disclosure, the blended polyester steel-laminating film resistant to cooking discoloration is formed by hot melt lamination at a pressure of 2-10 kg and a temperature of 180-260° C.

In the film-laminated metal plate according another aspect of the present disclosure, the skin layer comprising 1200-2000 ppm by mass of $SiO_2$ added by in-situ polymerization in the blended polyester steel-laminating film is not bonded to or in direct contact with the metal substrate.

In the film-laminated metal plate according another aspect of the present disclosure, the polyethylene terephthalate has a melting point of 250-265° C., and the polybutylene terephthalate has a melting point of 220-235° C.

In the film-laminated metal plate according to another aspect of the present disclosure, the metal substrate is selected from the group consisting of a chromium-plated steel plate, a tin-plated steel plate, a low-tin steel plate (having a tin coating weight of ≤1.1 $g/m^2$), a galvanized steel plate, a cold-rolled steel plate, a stainless steel plate, and an aluminum plate.

According to still another aspect of the present disclosure, there is provided a film-laminated metal can for medium-end to high-end food or beverage packaging, wherein the film-laminated metal can is made of the film-laminated metal plate described above.

Compared with the prior art, the present disclosure shows the following beneficial effects:

In the present disclosure, the specified polyethylene terephthalate and polybutylene terephthalate are blended homogeneously at the specified ratio, and then the film is formed by a three-layer co-extrusion process, wherein one of the skin layers of the film comprises 1200-2000 ppm, preferably 1800 ppm $SiO_2$, so that the film-laminated metal plate prepared from the blended polyester film has excellent resistance to cooking discoloration, and may be used for a metal container for food or beverage packaging that requires high-temperature sterilization.

Due to the addition of $SiO_2$ to the polymer by in-situ polymerization, the crystallization properties of the polyester film are improved uniformly on the whole. By substituting the traditional way of adding $SiO_2$ in the form of master batch, addition of a high melting point resin to the film is avoided. The above two points have improved the overall performance of the polyester film significantly, and the complex processing endurance and corrosion resistance of the film-laminated steel comprising the film of the present disclosure have been improved notably.

DETAILED DESCRIPTION

In the following detailed description, the objectives, features, and advantages of the present disclosure will become clearer and more apparent with reference to the non-limiting examples, and the content is sufficient to enable those skilled in the art to understand and implement the present disclosure.

According to one aspect of the present disclosure, there is provided a blended polyester steel-laminating film resistant to cooking discoloration, wherein the blended polyester steel-laminating film comprises polyethylene terephthalate and polybutylene terephthalate, wherein the blended polyester steel-laminating film comprises three layers including an upper layer, an intermediate layer and a lower layer, wherein at least one skin layer of the blended polyester steel-laminating film comprises 1200-2000 ppm, preferably 1500-2000 ppm, more preferably 1800 ppm by mass of $SiO_2$ added by in-situ polymerization. Preferably, $SiO_2$ is added to a monomer mixture for preparing polyethylene terephthalate or polybutylene terephthalate, so that polyethylene terephthalate comprising $SiO_2$ or polybutylene terephthalate comprising $SiO_2$ is prepared by in-situ polymerization. In the present disclosure, at least one of the polyethylene terephthalate and polybutylene terephthalate used to prepare the blended polyester steel-laminating film comprises $SiO_2$ added by in-situ polymerization. In some preferred embodiments, the blended polyester steel-laminating film comprises polyethylene terephthalate comprising $SiO_2$ added by in-situ polymerization and polybutylene terephthalate.

In the blended polyester steel-laminating film of the present disclosure, the mass ratio of polyethylene terephthalate to polybutylene terephthalate generally ranges from 6:4 to 4:6. The mass ratio of polyethylene terephthalate to polybutylene terephthalate in each layer of the blended polyester steel-laminating film may be the same or different, provided that the ratio of the total mass of polyethylene terephthalate to the total mass of polybutylene terephthalate in the three layers is within the above range of 6:4 to 4:6, and at least one skin layer comprises the above-mentioned mass proportion of $SiO_2$. In some embodiments, the ratio of polyethylene terephthalate to polybutylene terephthalate is 6:4, 5:5, or 4:6.

Polyethylene terephthalate and polybutylene terephthalate suitable for the present disclosure may be various commercially available polyethylene terephthalate and polybutylene terephthalate. Generally, polyethylene terephthalate has a melting point of 250-265° C., and polybutylene terephthalate has a melting point of 220-235° C. By selecting such polyethylene terephthalate and polybutylene terephthalate, the film of the present disclosure prepared according to the ratio of the present disclosure has excellent resistance to cooking discoloration. After the film is cooked in water, an acid, a sulfur-containing aqueous solution or a similar solution at a high temperature for a long time, no cooking discoloration occurs to the surface of the film, and the surface of the film is not wrinkled or peeled from the metal plate.

In the blended polyester steel-laminating film resistant to cooking discoloration according to one aspect of the present disclosure, the blended polyester steel-laminating film is a homogeneous mixture of polyethylene terephthalate and polybutylene terephthalate, wherein the three layers including the upper layer, the intermediate layer and the lower layer are formed into the blended polyester steel-laminating film by a three-layer co-extrusion biaxial stretching process.

In the blended polyester steel-laminating film resistant to cooking discoloration according to one aspect of the present disclosure, the blended polyester steel-laminating film is manufactured at a temperature of 240-275° C.

In the blended polyester steel-laminating film resistant to cooking discoloration according to one aspect of the present disclosure, the blended polyester steel-laminating film has a thickness of 12-35 um.

Example 1

In the method of producing a blended polyester steel-laminating film, the blended polyester steel-laminating film was manufactured by a biaxial stretching process at a manufacturing temperature of 240-275° C. The blended polyester steel-laminating film comprised 5 parts of polyethylene terephthalate and 5 parts of polybutylene terephthalate. The melting point of polyethylene terephthalate was 250° C., and the melting point of polybutylene terephthalate was 220° C. The blended polyester was mixed homogeneously, and made into a film by co-extrusion biaxial stretching of three layers including an upper layer, an intermediate layer and a lower layer. The film had a thickness of 15 um. One skin layer of the blended polyester film comprised 1800 ppm Sift.

Example 2

In the method of producing a blended polyester steel-laminating film, the blended polyester steel-laminating film was manufactured by a biaxial stretching process at a manufacturing temperature of 240-275° C. The blended polyester steel-laminating film comprised 4 parts of polyethylene terephthalate and 6 parts of polybutylene terephthalate. The melting point of polyethylene terephthalate was 255° C., and the melting point of polybutylene terephthalate was 230° C. The blended polyester was mixed homogeneously, and made into a film by co-extrusion biaxial stretching of three layers including an upper layer, an intermediate layer and a lower layer. The film had a thickness of 15 um. One skin layer of the blended polyester film comprised 1800 ppm Sift.

Example 3

In the method of producing a blended polyester steel-laminating film, the blended polyester steel-laminating film was manufactured by a biaxial stretching process at a manufacturing temperature of 240-275° C. The blended polyester steel-laminating film comprised 6 parts of polyethylene terephthalate and 4 parts of polybutylene terephthalate. The melting point of polyethylene terephthalate was 260° C., and the melting point of polybutylene terephthalate was 225° C. The blended polyester was mixed homogeneously, and made into a film by co-extrusion biaxial stretching of three layers including an upper layer, an intermediate layer and a lower layer. The film had a thickness of 20 um. One skin layer of the blended polyester film comprised 1800 ppm $SiO_2$.

Example 4

In the method of producing a blended polyester steel-laminating film, the blended polyester steel-laminating film was manufactured by a biaxial stretching process at a manufacturing temperature of 240-275° C. The blended polyester steel-laminating film comprised 6 parts of polyethylene terephthalate and 4 parts of polybutylene terephthalate. The melting point of polyethylene terephthalate was 265° C., and the melting point of polybutylene terephthalate was 220° C. The blended polyester was mixed homogeneously, and made into a film by co-extrusion biaxial stretching of three layers including an upper layer, an intermediate layer and a lower layer. The film had a thickness of 35 um. One skin layer of the blended polyester film comprised 1800 ppm $SiO_2$.

Example 5

In the method of producing a blended polyester steel-laminating film, the blended polyester steel-laminating film was manufactured by a biaxial stretching process at a manufacturing temperature of 240-275° C. The blended polyester steel-laminating film comprised 5 parts of polyethylene terephthalate and 5 parts of polybutylene terephthalate. The melting point of polyethylene terephthalate was 250° C., and the melting point of polybutylene terephthalate was 220° C. The blended polyester was mixed homogeneously, and made into a film by co-extrusion biaxial stretching of three layers including an upper layer, an intermediate layer and a lower layer. The film had a thickness of 12 um. One skin layer of the blended polyester film comprised 1800 ppm $SiO_2$.

Example 6

In the method of producing a blended polyester steel-laminating film, the blended polyester steel-laminating film was manufactured by a biaxial stretching process at a manufacturing temperature of 240-275° C. The blended polyester steel-laminating film comprised 4 parts of polyethylene terephthalate and 6 parts of polybutylene terephthalate. The melting point of polyethylene terephthalate was 250° C., and the melting point of polybutylene terephthalate was 235° C. The blended polyester was mixed homogeneously, and made into a film by co-extrusion biaxial stretching of three layers including an upper layer, an intermediate layer and a lower layer. The film had a thickness of 35 um. One skin layer of the blended polyester film comprised 1800 ppm $SiO_2$.

Example 7

In the method of producing a blended polyester steel-laminating film, the blended polyester steel-laminating film was manufactured by a biaxial stretching process at a manufacturing temperature of 240-275° C. The blended polyester steel-laminating film comprised 4 parts of polyethylene terephthalate and 6 parts of polybutylene terephthalate. The melting point of polyethylene terephthalate was 265° C., and the melting point of polybutylene terephthalate was 225° C. The blended polyester was mixed homogeneously, and made into a film by co-extrusion biaxial stretching of three layers including an upper layer, an intermediate layer and a lower layer. The film had a thickness of 12 um. One skin layer of the blended polyester film comprised 1200 ppm $SiO_2$.

Example 8

In the method of producing a blended polyester steel-laminating film, the blended polyester steel-laminating film was manufactured by a biaxial stretching process at a manufacturing temperature of 240-275° C. The blended polyester steel-laminating film comprised 6 parts of polyethylene terephthalate and 4 parts of polybutylene terephthalate. The melting point of polyethylene terephthalate was 265° C., and the melting point of polybutylene terephthalate was 220° C. The blended polyester was mixed homogeneously, and made into a film by co-extrusion biaxial stretching of three layers including an upper layer, an intermediate layer and a lower layer. The film had a thickness of 15 um. One skin layer of the blended polyester film comprised 2000 ppm $SiO_2$.

Comparative Example 1

In the method of producing a blended polyester steel-laminating film, the blended polyester steel-laminating film was manufactured by a biaxial stretching process at a manufacturing temperature of 240-275° C. The blended polyester steel-laminating film comprised 5 parts of polyethylene terephthalate and 5 parts of polybutylene terephthalate. The melting point of polyethylene terephthalate was 270° C., and the melting point of polybutylene terephthalate was 215° C. The blended polyester was mixed homogeneously, and made into a film by co-extrusion biaxial stretching of three layers including an upper layer, an intermediate layer and a lower layer. The film had a thickness of 15 um. One skin layer of the blended polyester film comprised 1200 ppm $SiO_2$ added by non-in-situ polymerization.

Comparative Example 2

In the method of producing a blended polyester steel-laminating film, the blended polyester steel-laminating film was manufactured by a biaxial stretching process at a manufacturing temperature of 240-275° C. The blended polyester steel-laminating film comprised 6 parts of polyethylene terephthalate and 4 parts of polybutylene terephthalate. The melting point of polyethylene terephthalate was 245° C., and the melting point of polybutylene terephthalate was 235° C. The blended polyester was mixed homogeneously, and made into a film by co-extrusion biaxial stretching of three layers including an upper layer, an intermediate layer and a lower layer. The film had a thickness of 15 um. One skin layer of the blended polyester film comprised 2000 ppm $SiO_2$.

Comparative Example 3

In the method of producing a blended polyester steel-laminating film, the blended polyester steel-laminating film was manufactured by a biaxial stretching process at a manufacturing temperature of 240-275° C. The blended polyester steel-laminating film comprised 4 parts of polyethylene terephthalate and 6 parts of polybutylene terephthalate. The melting point of polyethylene terephthalate was 270° C., and the melting point of polybutylene terephthalate was 235° C. The blended polyester was mixed homogeneously, and made into a film by co-extrusion biaxial stretching of three layers including an upper layer, an intermediate layer and a lower layer. The film had a thickness of 15 um. One skin layer of the blended polyester film comprised 1800 ppm $SiO_2$ added by non-in-situ polymerization.

Comparative Example 4

In the method of producing a blended polyester steel-laminating film, the blended polyester steel-laminating film was manufactured by a biaxial stretching process at a manufacturing temperature of 240-275° C. The blended polyester steel-laminating film comprised 6 parts of polyethylene terephthalate and 4 parts of polybutylene terephthalate. The melting point of polyethylene terephthalate was 250° C., and the melting point of polybutylene terephthalate was 215° C. The blended polyester was mixed homogeneously, and made into a film by co-extrusion biaxial stretching of three layers including an upper layer, an intermediate layer and a lower layer. The film had a thickness of 15 um. One skin layer of the blended polyester film comprised 1200 ppm $SiO_2$.

Test Example 1

The blended polyester films prepared in Examples 1-8 were thermally laminated on the surfaces of 0.16 mm thick chrome-plated steel plates at a pressure of 5 kg and a temperature of 245° C. to prepare film-laminated metal plates. The skin layer of each blended polyester film that comprised the amount of $SiO_2$ was the layer not in contact with the metal plate. Can bodies of can size 538 were prepared from the film-laminated metal plates using an experimental can-making mold. The results show that the films were not separated from the chromium-plated steel plates during the punching and deformation processes in the manufacture of the cans.

Similarly, the blended polyester films of Examples 1-8 were thermally laminated on the surfaces of tin-plated steel plates, low-tin steel plates, galvanized steel plates, cold-rolled steel plates, stainless steel plates, aluminum plates and the like to prepare film-laminated metal plates. The skin layer of each blended polyester film that comprised the amount of $SiO_2$ was the layer not in contact with the metal plate. Can bodies of can size 538 were prepared from the film-laminated metal plates using an experimental can-making mold. The results show that the films were not separated from the various steel plates during the punching and deformation processes in the manufacture of the cans.

Test Example 2

The film-laminated metal plates prepared by the above methods were evaluated by the methods described below. The results are shown in Table 1.

(1) Cooking Discoloration Resistance Performance

A can body was cooked at 121° C. for 45 minutes. Visual evaluation was performed to see whether discoloration occurred to the above can body after cooking. The state where no after-cooking discoloration occurred to the film on the outer wall of the can body till the final step is excellent.

(2) Acid resistance performance: After the film-laminated steel was punched into a can (can size 538), acid resistance performance evaluation was performed to represent corrosion resistance performance evaluation. The film-laminated can was filled with a 20 g/L citric acid solution. After the can was capped, the solution was boiled at 121° C. for 30 min. After cooling, the sample was taken out, and spots corroded by the acid on the surface of the sample were observed to evaluate the acid resistance performance of the film-laminated steel.

(3) Sulfur resistance performance: After the film-laminated steel was punched into a can (can size 538), sulfur resistance performance evaluation was performed to represent corrosion resistance performance evaluation. The film-laminated can was filled with a 0.5% $Na_2S$ solution. After the can was capped, the solution was boiled at 121° C. for 30 min. After cooling, the sample was taken out, and sulfide spots on the surface of the sample were observed to evaluate the sulfur resistance performance of the film-laminated steel.

TABLE 1

Evaluation results of cooking discoloration resistance and corrosion resistance

| Test Item | Cooking Discoloration Resistance | Acid Resistance | Sulfur Resistance |
| --- | --- | --- | --- |
| Example 1 | ◎ | ◎ | ◎ |
| Example 2 | ◎ | ◎ | ◎ |
| Example 3 | ◎ | ◎ | ◎ |
| Example 4 | ○ | ◎ | ◎ |
| Example 5 | ○ | ◎ | ◎ |
| Example 6 | ○ | ◎ | ◎ |
| Example 7 | ○ | ◎ | ◎ |
| Example 8 | ○ | ◎ | ◎ |
| Comparative Example 1 | Δ | ○ | ○ |
| Comparative Example 2 | X | Δ | ○ |
| Comparative Example 3 | Δ | ○ | ○ |
| Comparative Example 4 | X | ○ | Δ |

Note:
in Table 1, X means poor; Δ means mediocre; ○ means good; ◎ means very good.

To sum up, according to the present disclosure, after blended homogeneously, polyethylene terephthalate and polybutylene terephthalate were made into a film by a biaxial stretching process, wherein a blended polyester steel-laminating film having good formability and a thin thickness can be prepared. The blended polyester steel-laminating film may be used to prepare a film-laminated metal plate having excellent overall performances. The film-laminated metal plate may be used to manufacture a food or beverage packaging container, and the film-laminated metal plate and packaging container have excellent resistance to cooking discoloration.

Finally, it should be pointed out that although the present disclosure has been described with reference to the current specific examples, those skilled in the art should appreciate that the above examples are only used to illustrate the present disclosure, and are not used to limit the present disclosure. Various equivalent changes or substitutions can be made without departing from the concept of the present disclosure. Therefore, without departing from the essential spirit of the present disclosure, all changes and variations of the abovementioned examples will fall in the scope of the claims in the present disclosure.

The invention claimed is:

1. A blended polyester steel-laminating film resistant to cooking discoloration, wherein the blended polyester steel-laminating film comprises polyethylene terephthalate and polybutylene terephthalate, wherein the blended polyester steel-laminating film comprises three layers including an upper layer, an intermediate layer, and a lower layer, wherein the upper layer or the lower layer comprises 1200-2000 ppm by mass of $SiO_2$ added by in-situ polymerization, and wherein each of the upper layer, the intermediate layer, and the lower layer comprises the polyethylene terephthalate and the polybutylene terephthalate with a mass ratio from 6:4 to 4:6, and the mass ratios of the polyethylene terephthalate to the polybutylene terephthalate in each layer are the same or different.

2. The blended polyester steel-laminating film according to claim 1, wherein the upper layer or the lower layer comprises 1800 ppm by mass of $SiO_2$ added by in-situ polymerization.

3. The blended polyester steel-laminating film resistant to cooking discoloration according to claim 1, wherein the polyethylene terephthalate has a melting point of 250-265° C., and the polybutylene terephthalate has a melting point of 220-235° C.

4. The blended polyester steel-laminating film resistant to cooking discoloration according to claim 1, wherein a mass ratio of the polyethylene terephthalate to the polybutylene terephthalate is 6:4, 5:5 or 4:6.

5. The blended polyester steel-laminating film resistant to cooking discoloration according to claim 1, wherein the blended polyester steel-laminating film has a thickness of 12-35 um.

6. A method of manufacturing the blended polyester steel-laminating film resistant to cooking discoloration according to claim 1, wherein the method comprises forming a homogeneous mixture of the polyethylene terephthalate and the polybutylene terephthalate into the blended polyester steel-laminating film by a three-layer coextrusion biaxial stretching process.

7. The method of manufacturing the blended polyester steel-laminating film resistant to cooking discoloration according to claim 6, wherein the blended polyester steel-laminating film is manufactured at a temperature of 240-275° C.

8. A film-laminated metal plate, wherein the film-laminated metal plate comprises a metal substrate and the blended polyester steel-laminating film according to claim 1.

9. The film-laminated metal plate according to claim 8, wherein the metal substrate is selected from the group consisting of a chromium-plated steel plate, a tin-plated steel plate, a low-tin steel plate, a galvanized steel plate, a cold-rolled steel plate, a stainless steel plate, and an aluminum plate.

10. The film-laminated metal plate according to claim 8, wherein a skin layer of the blended polyester steel-laminating film that comprises 1200-2000 ppm by mass of $SiO_2$ added by in-situ polymerization is a layer that is not in contact with the metal substrate.

11. A method of manufacturing the film-laminated metal plate according to claim 8, wherein the method comprises thermal lamination of the blended polyester steel-laminating film on a surface of the metal substrate by hot melt lamination at a pressure of 2-10 kg and a temperature of 180-260° C.

12. A film-laminated metal can for food or beverage packaging, wherein the film-laminated metal can is made of the film-laminated metal plate according to claim 8.

13. The film-laminated metal can according to claim 12, wherein the metal substrate of the film-laminated metal plate is selected from the group consisting of a chromium-plated steel plate, a tin-plated steel plate, a low-tin steel plate, a galvanized steel plate, a cold-rolled steel plate, a stainless steel plate, and an aluminum plate.

14. The film-laminated metal can according to claim 12, wherein in the film-laminated metal plate, a skin layer of the blended polyester steel-laminating film that comprises 1200-2000 ppm by mass of $SiO_2$ added by in-situ polymerization is a layer that is not in contact with the metal substrate.

15. The film-laminated metal plate according to claim 8, wherein the upper layer or the lower layer of the blended polyester steel-laminating film comprises 1800 ppm by mass of $SiO_2$ added by in-situ polymerization.

16. The film-laminated metal plate according to claim 8, wherein:
    the polyethylene terephthalate of the blended polyester steel-laminating film has a melting point of 250-265° C., and the polybutylene terephthalate has a melting point of 220-235° C.; and/or
    a mass ratio of the polyethylene terephthalate to the polybutylene terephthalate in the blended polyester steel-laminating film ranges from 6:4 to 4:6; and/or
    the blended polyester steel-laminating film has a thickness of 12-35 um.

17. The method of manufacturing the film-laminated metal plate according to claim 12, wherein the upper layer or the lower layer of the blended polyester steel-laminating film comprises 1800 ppm by mass of $SiO_2$ added by in-situ polymerization.

18. The method of manufacturing the film-laminated metal plate according to claim 11, wherein:
    the polyethylene terephthalate of the blended polyester steel-laminating film has a melting point of 250-265° C., and the polybutylene terephthalate has a melting point of 220-235° C.; and/or
    a mass ratio of the polyethylene terephthalate to the polybutylene terephthalate in the blended polyester steel-laminating film ranges from 6:4 to 4:6; and/or
    the blended polyester steel-laminating film has a thickness of 12-35 um; and/or
    the metal substrate is selected from the group consisting of a chromium-plated steel plate, a tin-plated steel plate, a low-tin steel plate, a galvanized steel plate, a cold-rolled steel plate, a stainless steel plate, and an aluminum plate.

19. The film-laminated metal can according to claim 12, wherein:

the polyethylene terephthalate of the blended polyester steel-laminating film has a melting point of 250-265° C., and the polybutylene terephthalate has a melting point of 220-235° C.; and/or a mass ratio of the polyethylene terephthalate to the polybutylene terephthalate in the blended polyester steel-laminating film ranges from 6:4 to 4:6; and/or the blended polyester steel-laminating film has a thickness of 12-35 um.

* * * * *